United States Patent
Champel et al.

(10) Patent No.: US 12,475,603 B2
(45) Date of Patent: Nov. 18, 2025

(54) METHOD AND APPARATUS OF ENCODING/DECODING POINT CLOUD GEOMETRY DATA CAPTURED BY A SPINNING SENSORS HEAD

(71) Applicant: Beijing Xiaomi Mobile Software Co., Ltd., Beijing (CN)

(72) Inventors: Mary-Luc Georges Henry Champel, Beijing (CN); Sebastien Lasserre, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 332 days.

(21) Appl. No.: 18/258,829

(22) PCT Filed: Oct. 13, 2021

(86) PCT No.: PCT/CN2021/123650
§ 371 (c)(1),
(2) Date: Jun. 22, 2023

(87) PCT Pub. No.: WO2022/134753
PCT Pub. Date: Jun. 30, 2022

(65) Prior Publication Data
US 2023/0401754 A1    Dec. 14, 2023

(30) Foreign Application Priority Data
Dec. 23, 2020   (EP) .................................. 20306672

(51) Int. Cl.
*G06T 9/00*   (2006.01)
(52) U.S. Cl.
CPC .................... *G06T 9/001* (2013.01)

(58) Field of Classification Search
None
See application file for complete search history.

(56) References Cited

U.S. PATENT DOCUMENTS

| | | | |
|---|---|---|---|
| 12,294,740 B2 * | 5/2025 | Sugio | G06T 9/004 |
| 2019/0051017 A1 * | 2/2019 | Beek | G06T 7/521 |

(Continued)

OTHER PUBLICATIONS

European Patent Office, Extended European Search Report issued in Application No. 20306674.1 dated Jun. 15, 2021, 16 pages.

(Continued)

*Primary Examiner* — Anand P Bhatnagar
(74) *Attorney, Agent, or Firm* — Finnegan, Henderson, Farabow, Garrett & Dunner, L.L.P.

(57) ABSTRACT

There is provided methods and apparatus of encoding/decoding a point cloud representing a physical object. Points are captured by a spinning sensors head and are represented by sensor indices associated with sensors that captured the points, azimuthal angles representing capture angles of said sensors, and radius values of spherical coordinates of the point. Points are ordered based order indices obtained from the azimuthal angles and the sensor indices. Order index differences are encoded. An order index difference represents a difference between order indices associated with two consecutive ordered points. Optionally, the method encodes radius values, residual azimuthal angles associated with ordered points and residuals of three-dimensional cartesian coordinates of ordered points based on their three-dimensional cartesian coordinates, decoded azimuthal angles based on azimuthal angles, decoded radius values and sensor indices.

12 Claims, 8 Drawing Sheets

(56) References Cited

U.S. PATENT DOCUMENTS

| | | | |
|---|---|---|---|
| 2020/0143568 A1* | 5/2020 | Lasserre | H04N 19/20 |
| 2020/0175725 A1* | 6/2020 | Mekuria | G06T 15/08 |
| 2020/0302237 A1* | 9/2020 | Hennings Yeomans | G06V 20/56 |
| 2020/0394822 A1 | 12/2020 | Gao et al. | |
| 2021/0209777 A1* | 7/2021 | Zhao | H04N 21/234 |
| 2022/0303577 A1* | 9/2022 | Sugio | G06T 9/004 |
| 2024/0046524 A1* | 2/2024 | Lasserre | H04N 19/182 |
| 2025/0014236 A1* | 1/2025 | Duckworth | G06T 11/001 |

OTHER PUBLICATIONS

J. Taquet et al., (Xiaomi), "[G-PCC][New] Improved Quantization of Azimuthal Angle in Predictive Geometry Coding", International Organisation for Standardisation Organisation Internationale De Normalisation ISO/IEC JTC 1/SC 29/WG 7 Coding of Moving Pictures and Audio, ISO/IEC JTC 1/SC 29/WG 7 m55979, Jan. 2021, online, 10 pages.

European Patent Office, Extended European Search Report issued in Application No. 20306672.5 dated Jun. 8, 2021, 12 pages.

European Patent Office, Extended European Search Report issued in Application No. 20306673.3 dated Jun. 8, 2021, 8 pages.

\* cited by examiner

METHOD AND APPARATUS OF ENCODING/DECODING POINT CLOUD GEOMETRY DATA CAPTURED BY A SPINNING SENSORS HEAD

CROSS-REFERENCE TO RELATED APPLICATION

This application is a national phase entry of International Application PCT/CN2021/123650, filed on Oct. 13, 2021, which claims priority to European Patent Application No. EP20306672.5 filed on Dec. 23, 2020, the content of both of which is hereby incorporated by reference in its entirety into this disclosure.

FIELD

The present application generally relates to point cloud compression and, in particular to methods and apparatus of encoding/decoding point cloud geometry data captured by a spinning sensor head.

BACKGROUND

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

SUMMARY

According to a first aspect of the present application, there is provided a method of encoding a point cloud into a bitstream of encoded point cloud data representing a physical object. The method includes obtaining, for each point of the point cloud, a sensor index associated with a sensor that captured the point, an azimuthal angle representing a capture angle of said sensor; ordering points of the point cloud based on the azimuthal angles and the sensor indices; and encoding, into the bitstream, at least one order index difference representing a difference between order indices of two consecutive ordered points.

According to a second aspect of the present application, there is provided a method of decoding a point cloud from a bitstream of encoded point cloud data representing a physical object. The method includes decoding, from the bitstream, at least one order index difference representing a difference between order indices of two consecutive ordered points of the point cloud; and obtaining, for each point of the point cloud, a sensor index associated with a sensor that captured the point and an azimuthal angle representing a capture angle of said sensor from an order index obtained from a decoded order index difference.

According to a third aspect of the present application, there is provided an electronic device. The electronic device includes a processor; and a memory for storing instructions executable by the processor. The processor is configured to implement a method according to the first or second aspect of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DESCRIPTION OF EXEMPLARY EMBODIMENTS

Figure 1:
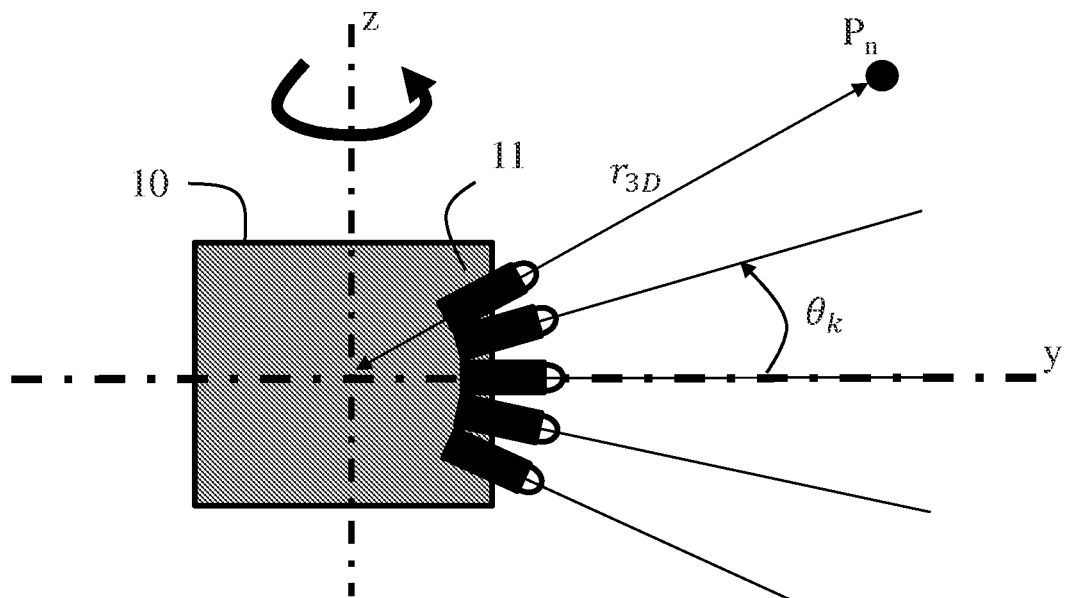
FIG. 1 illustrates a side view of a sensors head and some of its parameters in accordance with prior art.

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x, y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/VVG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured sparse geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data captured by a spinning Lidar mounted on a moving vehicle. This usually requires a simple and low-latency embarked encoder. Simplicity is required because the encoder is likely to be deployed on computing units which perform other processing in parallel, such as (semi-)autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to spinning Lidar-captured sparse geometry data have been already exploited in G-PCC and have led to very significant gains of compression.

Figure 2:
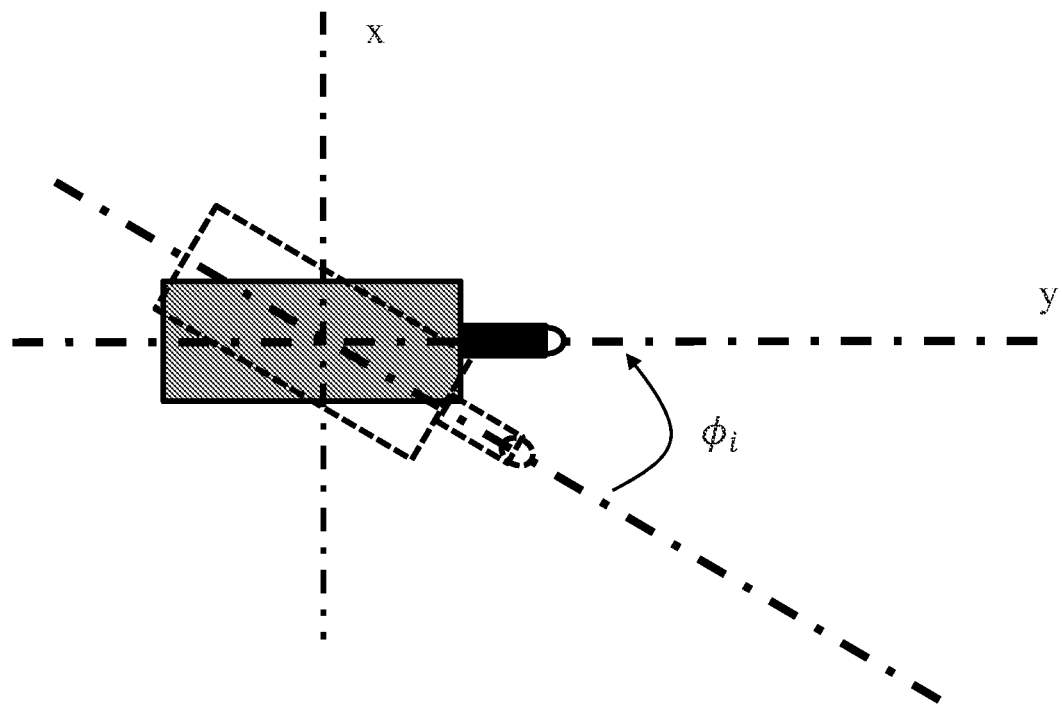
FIG. 2 illustrates a top view of the sensors head and some of its parameters in accordance with prior art.

First, G-PCC exploits the elevation angle (relative to the horizontal ground) of capture from a spinning Lidar head as depicted on FIGS. 1 and 2. A Lidar head 10 includes a set of sensors 11 (lasers), here five lasers are represented. The Lidar head 10 may spin around a vertical axis z to capture geometry data of a physical object. Lidar-captured geometry data is then represented in spherical coordinates $(r_{3D}, \phi, \theta)$, where $r_{3D}$ is the distance of a point P from the Lidar head's center, $\phi$ is an azimuthal angle of the Lidar head's spin relative to a referential, and $\theta$ is an elevation angle of a sensor k of the Lidar head relative to a horizontal referential plane.

Figure 3:
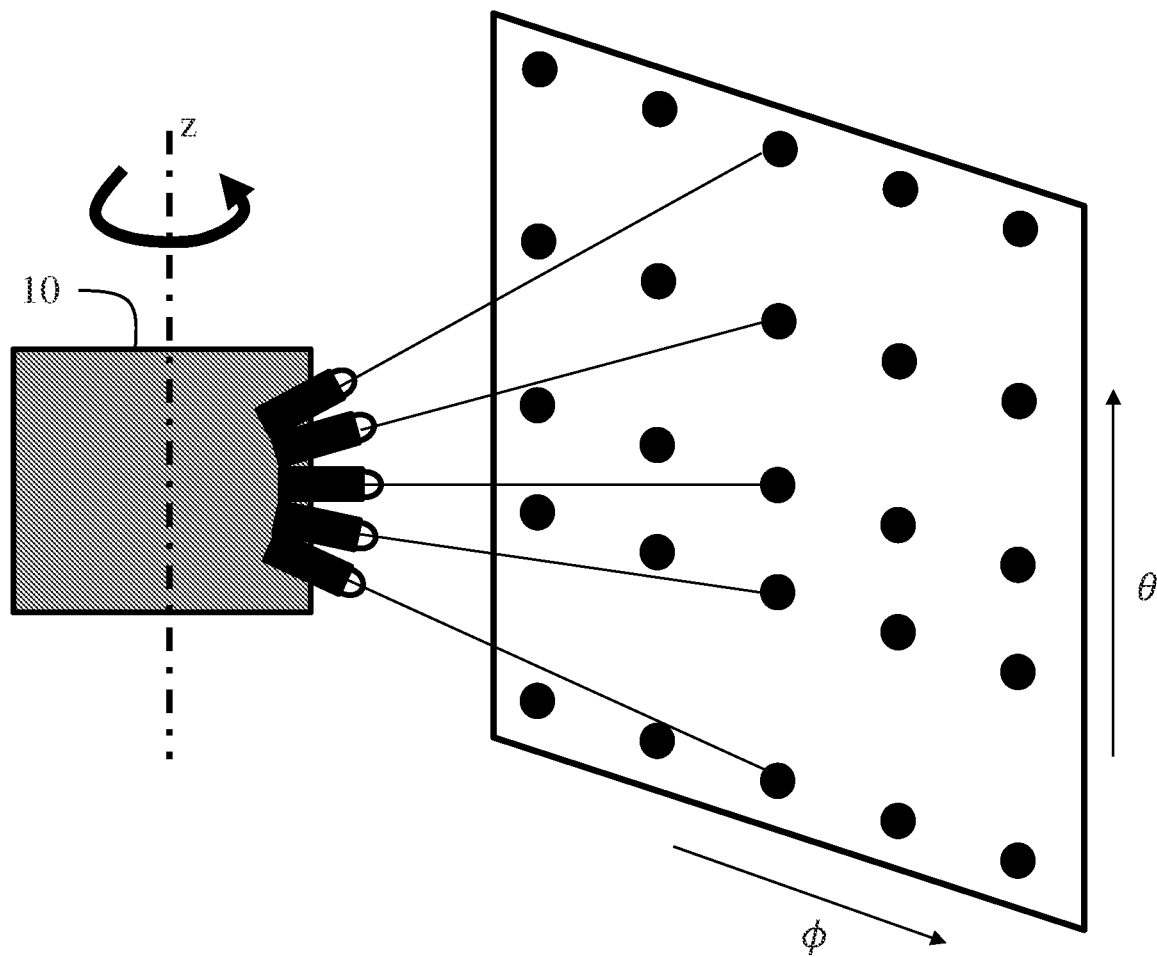
FIG. 3 illustrates a regular distribution of data captured by a spinning sensors head in accordance with prior art.

A regular distribution along the azimuthal angle has been observed on Lidar captured data as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i$, $\forall i=0$ to I−1 where I is a number of azimuthal angles used for the capture of the points and $\theta_k$ $\forall k=0$ to K−1 where K is a number of sensors of the Lidar head 10. Basically, G-PCC represents Lidar-captured sparse geometry data on a 2D discrete angular plane $(\phi, \theta)$ as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into angular coordinates $(\phi, \theta)$ and from the location of these angular coordinates relative to discrete angular coordinates $(\phi_i, \theta_k)$ obtained from precedingly coded points. The predictive tree directly codes a first version of a point location in the angular coordinates $(r_{2D}, \phi, \theta)$, where $r_{2D}$ is the projected radius on the horizontal xy plane as depicted on FIG. 4, using the quasi 1D nature $(r_{2D}, \phi_i, \theta_k)$ of this coordinate space. Then, angular coordinates $(r_{2D}, \phi, \theta)$ are converted into 3D cartesian coordinates (x,y,z) and a xyz residual is coded to tackle the errors of coordinate conversion, the approximation of elevation and azimuthal angles and potential noise.

Figure 5:
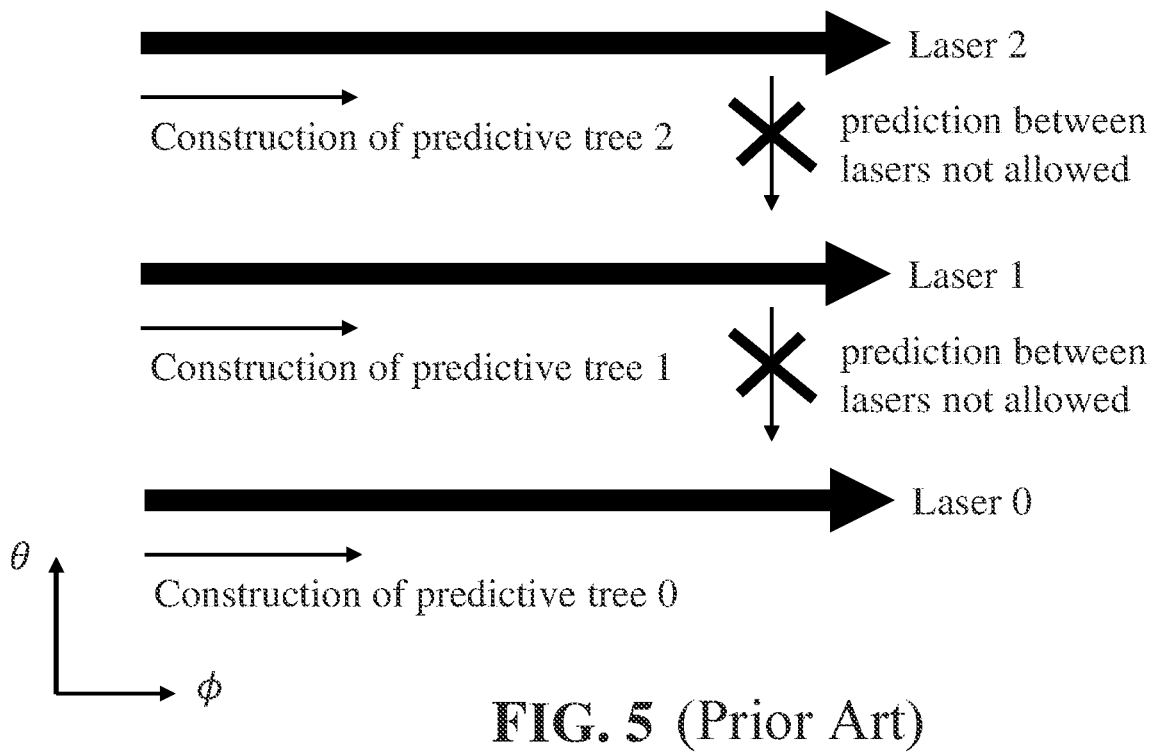
FIG. 5 illustrates the encoding of a predictive tree in accordance with prior art.

G-PCC does use the angular priors to better compress spinning Lidar-captured sparse geometry data but does not adapt the coding structure to the order of capture. By its very nature, the occupancy tree must be coded down to its last depth before outputting a point. This occupancy is coded in the so-called breadth-first order: the occupancy of the root node is first coded, indicating its occupied child nodes; then the occupancy for each of the occupied child nodes is coded, indicating the occupied grand-child nodes; and so on iteratively over the tree depth until leaf nodes can be determined and the corresponding points are provided/output to an application or to the attribute(s) coding scheme. Regarding the predictive tree, the encoder is free to choose the order of point in the tree, but to obtain good compression performance, to optimize the prediction accuracy, G-PCC proposes to code one tree per laser, as depicted on FIG. 5. This has mainly the same drawback as using one coding slice per laser, i.e. non-optimal compression performance because prediction between lasers (sensors) is not allowed and does not provide encoder low latency. Worse, one should have one coding processing per laser (sensor) and the number of core coding units should equal the number of sensing lasers; this is not practical.

In brief, in a framework of a spinning sensors head used for capturing sparse geometry data of a point cloud, prior arts do not solve the problem of combining encoding and decoding simplicity, low latency and compression performance.

At least one exemplary embodiment of the present application has been devised with the foregoing in mind.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

Figure 6:
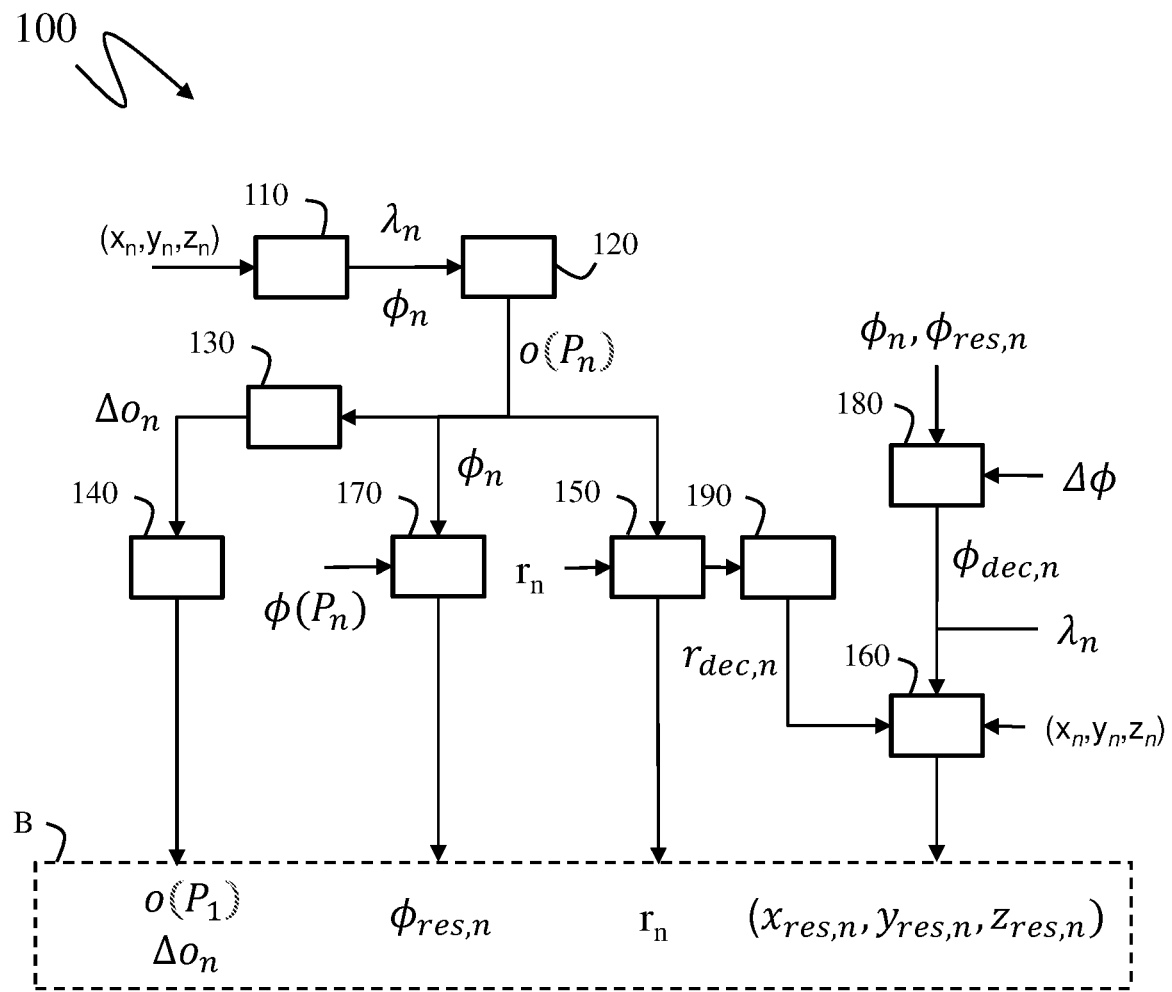
FIG. 6 illustrates a block diagram of steps of a method 100 of encoding a point cloud into a bitstream of encoded point cloud data representing a physical object in accordance with at least one exemplary embodiment.

FIG. 6 illustrates a block diagram of steps of a method 100 of encoding a point cloud into a bitstream of encoded point cloud data representing a physical object in accordance with at least one exemplary embodiment.

Geometry data of the point cloud, i.e. the 3D locations of points of the point cloud, is captured by a spinning sensor head.

The spinning sensors head may be the spinning Lidar head 10 including multiple lasers (sensors) as explained above. But the scope of the disclosure is not limited to a spinning Lidar head and may apply to any sensors head able to spin around an axis and to capture 3D locations points representing a physical object for each capture angular angle. Sensors may be cameras, depth sensors, lasers, Lidars or scanners.

Figure 7:
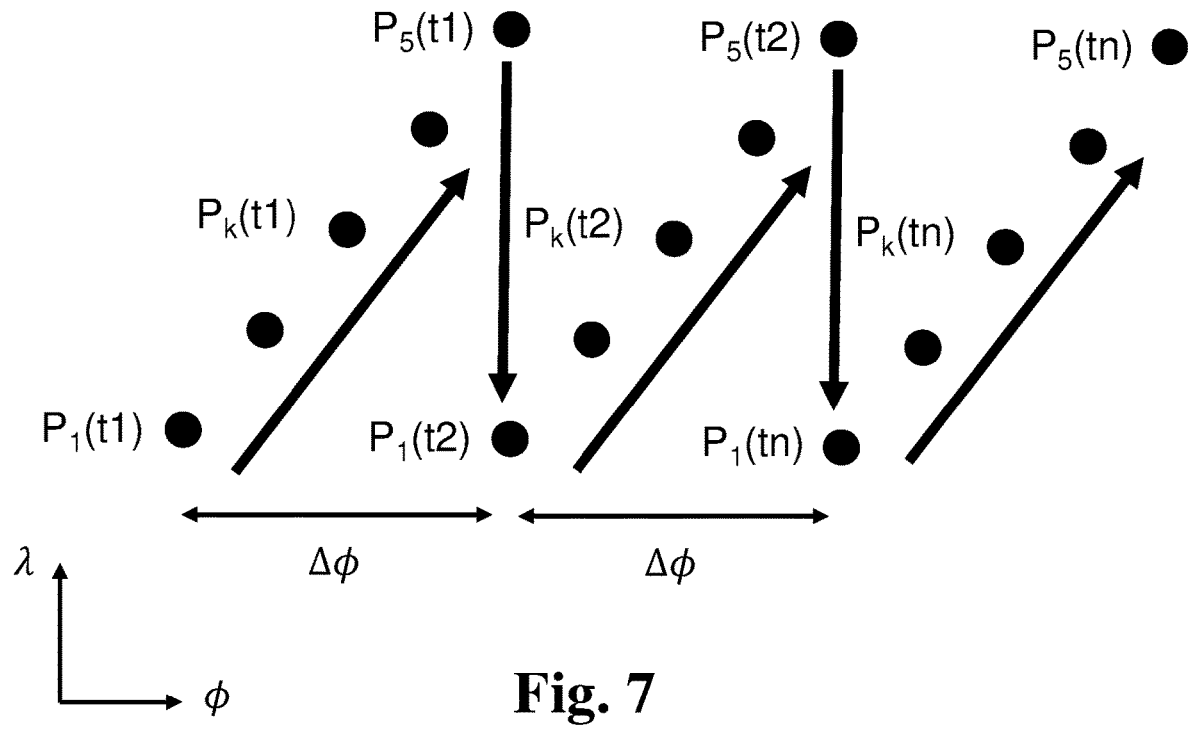
FIG. 7 illustrates an example of captured point represented in a 2D space in accordance with one exemplary embodiment of the present application.

The captured 3D locations are represented in a 2D coordinates $(\phi, \lambda)$ system, as depicted on FIG. 7, together with radius values $r_{2D}$ or $r_{3D}$. The coordinate $\phi$ is the azimuthal angle of the sensor head's spin whose discrete values are denoted $\phi_i$ ($\forall i=0$ to I−1). The coordinate $\lambda$ is a sensor index whose discrete values are denoted $\lambda_k$ ($\forall k=0$ to K−1). The radius $r_{2D}$ or $r_{3D}$ belongs to a continuous range of values.

Due to the regular spin (rotation) of the sensors head and the continuous capture with fixed time interval, the azimuthal distance between two points probed by a same sensor is a multiple of an elementary azimuthal shift $\Delta\phi$ as depicted on FIG. 7. Then, for example, at a first captured time t1, five points $P_1(t1), \ldots, P_k(t1), \ldots P_5(t1)$ are probed by the five sensors of the Lidar head 10 of FIG. 1 with an azimuthal angle $\phi_1$, at a second capture time t2, five points $P_1(t2), \ldots, P_k(t2), \ldots P_5(t2)$ are probed by the sensors of the Lidar head 10 with an azimuth angle $\phi_2=\phi_1+\Delta\phi$, and so on. Consequently, the discrete value $\phi_1$ may be seen as the quantized value of the azimuthal angles $\phi$ of the points $P_1(t1), \ldots, P_k(t1), \ldots P_5(t1)$; quantization being obtained by a quantization step $\Delta\phi$. Similarly, the discrete value $\phi_2$ may be seen as the quantized value of the azimuthal angles $\phi$ of the points $P_1(t2), \ldots, P_k(t2), \ldots P_5(t2)$.

In step 110, for each point $P_n$ of the point cloud, a sensor index $\lambda_{k(n)}$ (among the set of sensor indices $\lambda_k$ ($\forall k=0$ to K−1)) associated with a sensor that captured the point $P_n$, an azimuthal angle $\phi_{i(n)}$ (among the set of discrete angles $\phi_i$ ($\forall i=0$ to I−1)) representing a capture angle of said sensor and a radius value $r_n$ of spherical coordinates of the point $P_n$ are obtained. For sake of simplicity, $\lambda_{k(n)}$ and the index i(n) will be respectively denoted $\lambda_n$ and $\phi_n$ hereafter. Consequently, $\phi_n$ is not an angle but an index i ($\forall i=0$ to I−1)) pointing to an angle $\phi_i$. Nevertheless, because there is an unambiguous relation between the index $\phi_n$ and the canonically associated azimuthal angle $\phi_{i(n)}=\phi_{\phi_n}$, the quantity $\phi_n$ is still referred as an azimuthal angle.

According to an exemplary embodiment of step 110, the sensor index $\lambda_n$ and the azimuthal angle $\phi_n$ are obtained by converting 3D cartesian coordinates $(x_n, y_n, z_n)$ representing the 3D location of a captured point $P_n$. These 3D cartesian coordinates $(x_n, y_n, z_n)$ may be output of the sensors head.

In step 120, points of the point cloud are ordered based on the azimuthal angles $\phi_n$ and the sensor indices $\lambda_n$.

According to an exemplary embodiment of step 120, the points are ordered according to a lexicographic order based first on the azimuthal angle and then on the sensor index. Referring back to FIG. 7, the ordered captured points are $P_1(t1), \ldots, P_k(t1), \ldots P_5(t1), P_1(t2), \ldots, P_k(t2), \ldots P_5(t2), \ldots, P_1(tn), \ldots, P_k(tn), \ldots P_5(tn)$.

The order index $o(P_n)$ of a point $P_n$ is obtained by:

$o(P_n)=\phi_n*K+\lambda_n$

According to an exemplary embodiment of step 120, the points are ordered according to a lexicographic order based first on the sensor index and then on the azimuthal angle.

The order index $o(P_n)$ of a point $P_n$ is obtained by:

$o(P_n)=\lambda_n*I+\phi_n$

In step 130, order index differences $\Delta o_n$ representing, each, a difference between order indices of two consecutive points $P_{n-1}$ and $P_n$ (for n=2 to N), are obtained by:

$\Delta o_n=o(P_n)-o(P_{n-1})$

Encoding ordered points into a bitstream B may include encoding at least one order index difference $\Delta o_n$. Optionally, it may also include encoding radius values $r_n$ (essentially representative of either $r_{2D}$ or $r_{3D}$ of the point $P_n$), cartesian residuals ($x_{res,n}$, $y_{res,n}$, $z_{res,n}$) of three-dimensional cartesian coordinates of ordered points and angular residual $\phi_{res,n}$.

The order index $o(P_1)$ of the first point $P_1$ may be directly coded into the bitstream B. This is equivalent to arbitrary setting the order index of a virtual zero-th point to zero, i.e. $o(P_0)=0$, and coding $\Delta o_1=o(P_1)-o(P_0)=o(P_1)$.

Given the order index $o(P_1)$ of the first point and the order differences $\Delta o_n$, one can recursively reconstruct the order index $o(P_n)$ of any point $P_n$ by:

$o(P_n)=o(P_{n-1})+\Delta o_n$

Then, sensor indices $\lambda_n$ and azimuthal angle $\phi_n$ are obtained by:

$\lambda_n=o(P_n) \text{modulo} K$ \hfill (1)

$\phi_n=o(P_n)/K$ \hfill (2)

where the division/K is the integer division (aka Euclidian division). Therefore, $o(P_1)$ and $\Delta o_n$ are an alternative representation of $\lambda_n$ and $\phi_n$.

Figure 8:
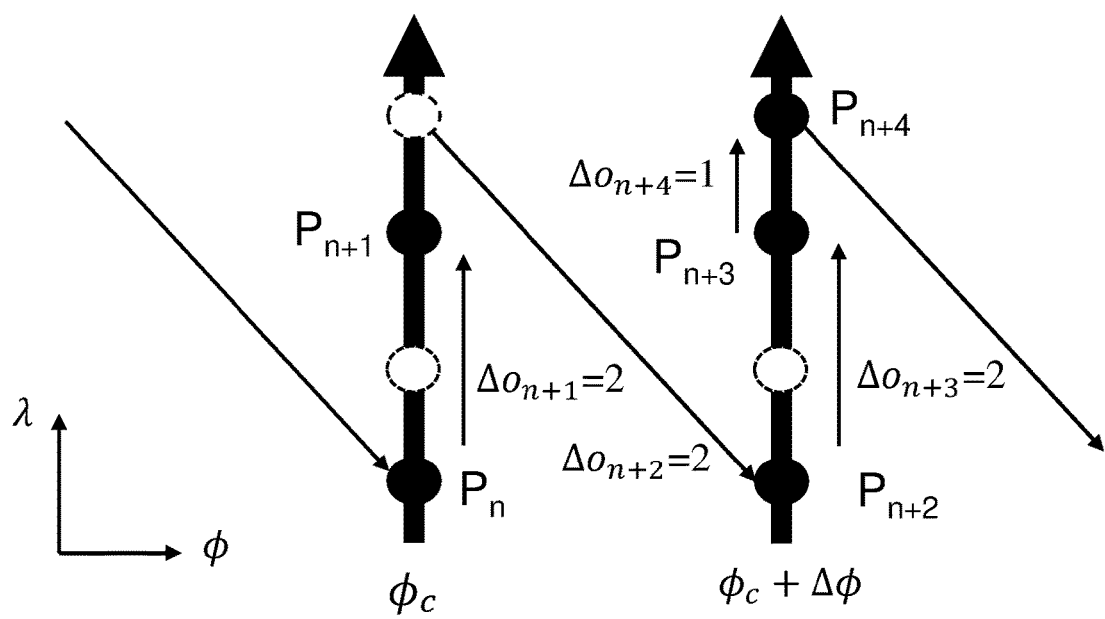
FIG. 8 illustrates an example of encoded ordered points in accordance with one exemplary embodiment of the present application.

In step 140, the order index $o(P_n)$ associated with ordered points are encoded, in the bitstream B, by encoding (N−1) order index differences $\Delta o_n$ ($\forall n=2$ to N) where N is the number of ordered points. Each order index $o(P_n)$ represents a difference between order indices associated with two consecutive ordered points. On FIG. 8, five ordered points are represented (black circles): two points $P_n$ and $P_{n+1}$ were captured in time t1 with an angular angle $\phi_c$ (among the $\phi_i$'s) and three points were captured in time t2 with an angular angle $\phi_c+\Delta\phi$. Assuming the coordinates of the first point $P_n$ in the 2D coordinates ($\phi, \lambda$) system are known beforehand, a first order index difference $\Delta o_{n+1}$ is obtained as a difference between the order index $o(P_{n+1})$ associated with the point $P_{n+1}$ and the order index $o(P_n)$ associated with the point $P_n$. A second order index difference $\Delta o_{n+2}$ is obtained as a difference between the order index $o(P_{n+2})$ associated with another ordered point $P_{n+2}$ and the order index $o(P_{n+1})$ associated with $P_{n+1}$, and so on.

Ordering the captured points provides interaction between points captured by different sensors of the spinning sensors head. A single encoding is thus required for encoding those ordered points leading to a very simple and low latency encoding.

Reconstructing points from the order index differences $\Delta o_n$ requires information such as a number N of points of the point cloud, an order index $o(P_1)$ of a first point in the 2D coordinates ($\phi, \lambda$) system, and sensor setup parameters such as the elementary azimuthal shift $\Delta\phi$ or an elevation angle $\theta_n$ associated with each sensor. This information may also be encoded in the bitstream B or signaled by another mean or may be known beforehand by a decoder.

According to an exemplary embodiment of step 140, the order index differences $\Delta o_n$ are entropy-encoded.

Optionally, the method further includes in step 150, encoding, in the bitstream B, the radius values $r_n$ of spherical coordinates associated with ordered points of the point cloud.

According to an exemplary embodiment of step 150, the radius values $r_n$ are quantized.

According to an exemplary embodiment of step 150, the radius values $r_n$ are quantized.

According to an exemplary embodiment of step 150, the radius values $r_n$ are quantized and entropy coded.

According to an exemplary embodiment of step 150, the radius values $r_n$ represents the radius $r_{3D}$.

Figure 4:
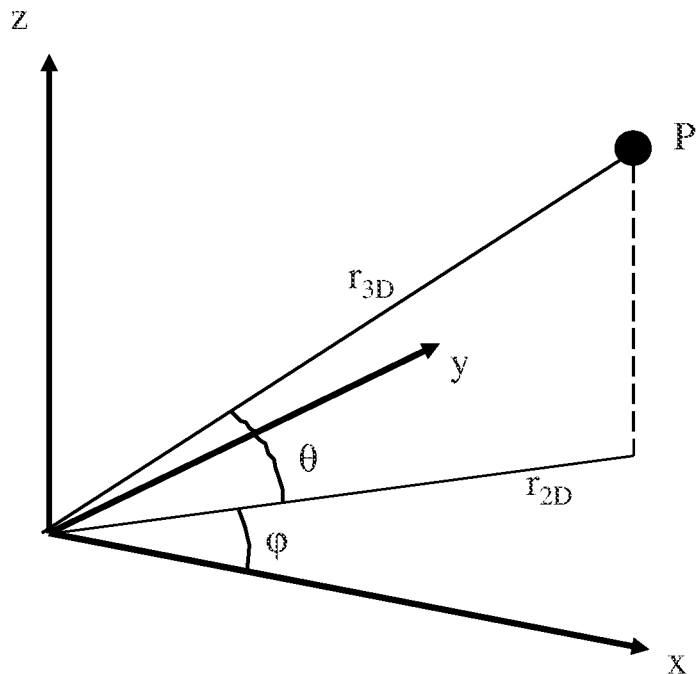
FIG. 4 illustrates a representation of a point in a 3D space in accordance with prior art.

According to an exemplary embodiment of step 150, the radius values $r_n$ represents the projected radius $r_{2D}$ on the horizontal xy plane as depicted on FIG. 4.

Optionally, the method further includes, in step 160, encoding the residuals ($x_{res,n}$, $y_{res,n}$, $z_{res,n}$) of three-dimensional cartesian coordinates of ordered points $P_n$ based on their three-dimensional cartesian coordinates $(x_n, y_n, z_n)$, on decoded azimuthal angles $\phi_{dec,n}$, on decoded radius values $r_{dec,n}$ obtained from radius values $r_n$, and on sensor indices $\lambda_n$.

According to an exemplary embodiment of step 160, the residuals ($x_{res,n}$, $y_{res,n}$, $z_{res,n}$) are differences between the three-dimensional cartesian coordinates $(x_n, y_n, z_n)$ of the points of the point cloud and estimated three-dimensional coordinates ($x_{estim,n}$, $y_{estim,n}$, $z_{estim,n}$).

According to an exemplary embodiment of step 160, the residuals ($x_{res,n}$, $y_{res,n}$, $z_{res,n}$) are given by:

$$\begin{cases} x_{res,n}=x_n-x_{estim,n} \\ y_{res,n}=y_n-y_{estim,n} \\ z_{res,n}=z_n-z_{estim,n} \end{cases}$$

According to an exemplary embodiment of step 160, the estimated coordinates ($x_{estim,n}$, $y_{estim,n}$) associated with an ordered point $P_n$ are based on decoded azimuthal angles $\phi_{dec,n}$ and decoded radius values $r_{dec,n}$ associated with the point $P_n$.

According to an exemplary embodiment of step 160, the residuals ($x_{res,n}$, $y_{res,n}$, $z_{res,n}$) are entropy coded.

According to an exemplary embodiment of step 160, the estimated coordinates ($x_{estim,n}$, $y_{estim,n}$) are given by:

$$\begin{cases} x_{estim,n} = r_{dec,n} * \cos(\phi_{dec,n}) \\ y_{estim,n} = r_{dec,n} * \sin(\phi_{dec,n}) \end{cases}$$

According to an exemplary embodiment of a step 160, the estimated coordinate ($z_{estim,n}$) associated with an ordered point is based on a decoded radius value $r_{dec,n}$ associated with the point and an elevation angle $\theta_n$ of a sensor that captured the point.

According to an exemplary embodiment of step 160, the estimated coordinates ($z_{estim,n}$) are also based on the sensor indices $\lambda_n$.

According to an exemplary embodiment of step 160, the estimated coordinates ($z_{estim,n}$) are given by:

$$z_{estim,n} = r_{dec,n} \tan \theta_n$$

Optionally, the method further includes, in step 170, encoding, in the bitstream B, residual azimuthal angles $\phi_{res,n}$ associated with ordered points. According to an exemplary embodiment of a step 170, the azimuthal angles $\phi_n$ are quantized by:

$$\phi_n = \text{round}(\phi(P_n)/\Delta\phi)$$

where $\phi(P_n)$ is the original azimuthal angle of point $P_n$. In this case, the set of discrete angles $\phi_i$ ($0 \leq i < I$) is essentially defined by $\phi_i = i * \Delta\phi$ and one obtains $\phi_{i(n)} = \phi_n * \Delta\phi$.

The order index $o(P_n)$ of a point $P_n$ is thus given by:

$$o(P_n) = \phi_n * K + \lambda_n = \text{round}(\phi(P_n)/\Delta\phi) * K + \lambda_n.$$

The residual azimuthal angles $\phi_{res,n}$ is given by:

$$\phi_{res,n} = \phi(P_n) - \phi_n * \Delta\phi \quad (3)$$

Figure 9:
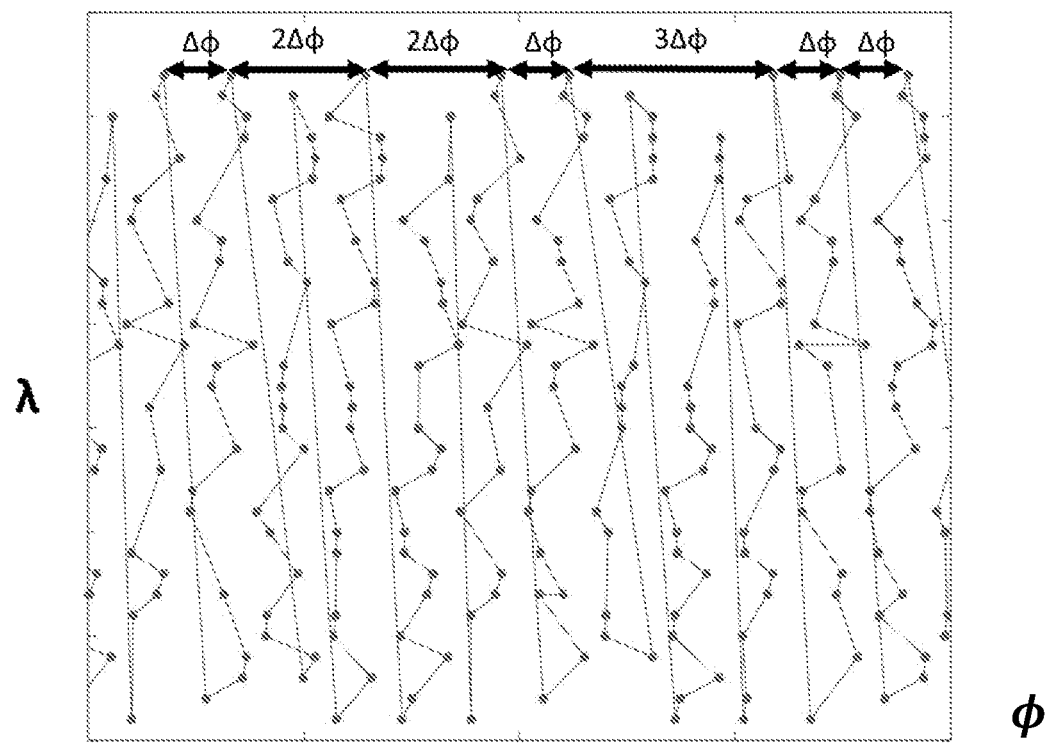
FIG. 9 illustrates an example of captured points in accordance with one exemplary embodiment of the present application.
Figure 10:
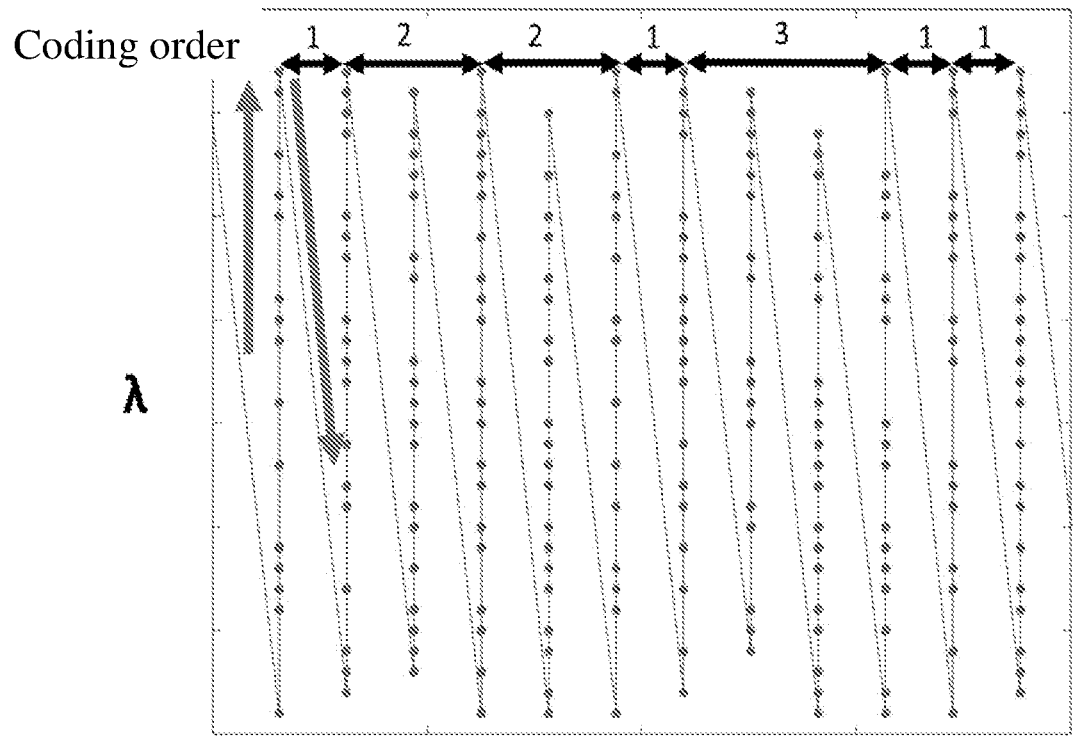
FIG. 10 illustrates an example of ordered and quantized captured points in accordance with one exemplary embodiment of the present application.

This exemplary embodiment of step 170 provides advantages because sometimes, in practice, not all points are captured at each capture time because a noise may be captured or because sensors may not be all perfectly aligned or because at least one laser beam of a Lidar sensors head may not be reflected. Captured points may then look as depicted on FIG. 9. Quantizing the azimuthal angles $\phi(P_n)$ leads to an easier discrete representation of points in the 2D coordinates ($\phi$, $\lambda$) system as depicted on FIG. 10 that allows an easier path for ordering the points of the point cloud.

The residual azimuthal angles $\phi_{res,n}$ are encoded into the bitstream B, preferably by quantizing and/or entropy-coding.

This exemplary embodiment of step 170 also reduces the dynamic of the angular angles to be encoded into the bitstream because only a residual is encoded rather than the full range value. High compression performance is reached.

Optionally, the method further includes, in step 180, the decoded azimuthal angles $\phi_{dec,n}$ are obtained based on the azimuthal angle $\theta_n$.

According to an embodiment of step 180, the decoded azimuthal angles $\phi_{dec,n}$ is given by:

$$\phi_{dec,n} = \phi_n * \Delta\phi$$

According to an embodiment of step 180, the decoded azimuthal angles $\phi_{dec,n}$ are obtained based on azimuthal angle $\phi_n$, the elementary azimuthal shift $\Delta\phi$ and residual azimuthal angles $\phi_{res,n}$.

According to an embodiment of step 180, the decoded azimuthal angles $\phi_{dec,n}$ is given by:

$$\phi_{dec,n} = \phi_n * \Delta\phi + \phi_{res,n}$$

According to an embodiment of step 180, the decoded azimuthal angles $\phi_{dec,n}$ are obtained based on the azimuthal angle $\phi_n$, the elementary azimuthal shift $\Delta\phi$ and a decoded angular residual $\phi_{dec,res,n}$ obtained by de-quantizing the quantized residual azimuthal angle $\phi_{res,n}$ given by equation 3.

According to an embodiment of step 180, the decoded azimuthal angles $\phi_{dec,n}$ is given by:

$$\phi_{dec,n} = \phi_n * \Delta\phi + \phi_{dec,res,n}$$

Optionally, in step 190, the decoded radius values $r_{dec,n}$ are obtained based on encoded radius values $r_n$.

According to an exemplary embodiment of step 190, the decoded radius values $r_{dec,n}$ is obtained by de-quantizing a quantized radius values $r_n$.

Figure 11:
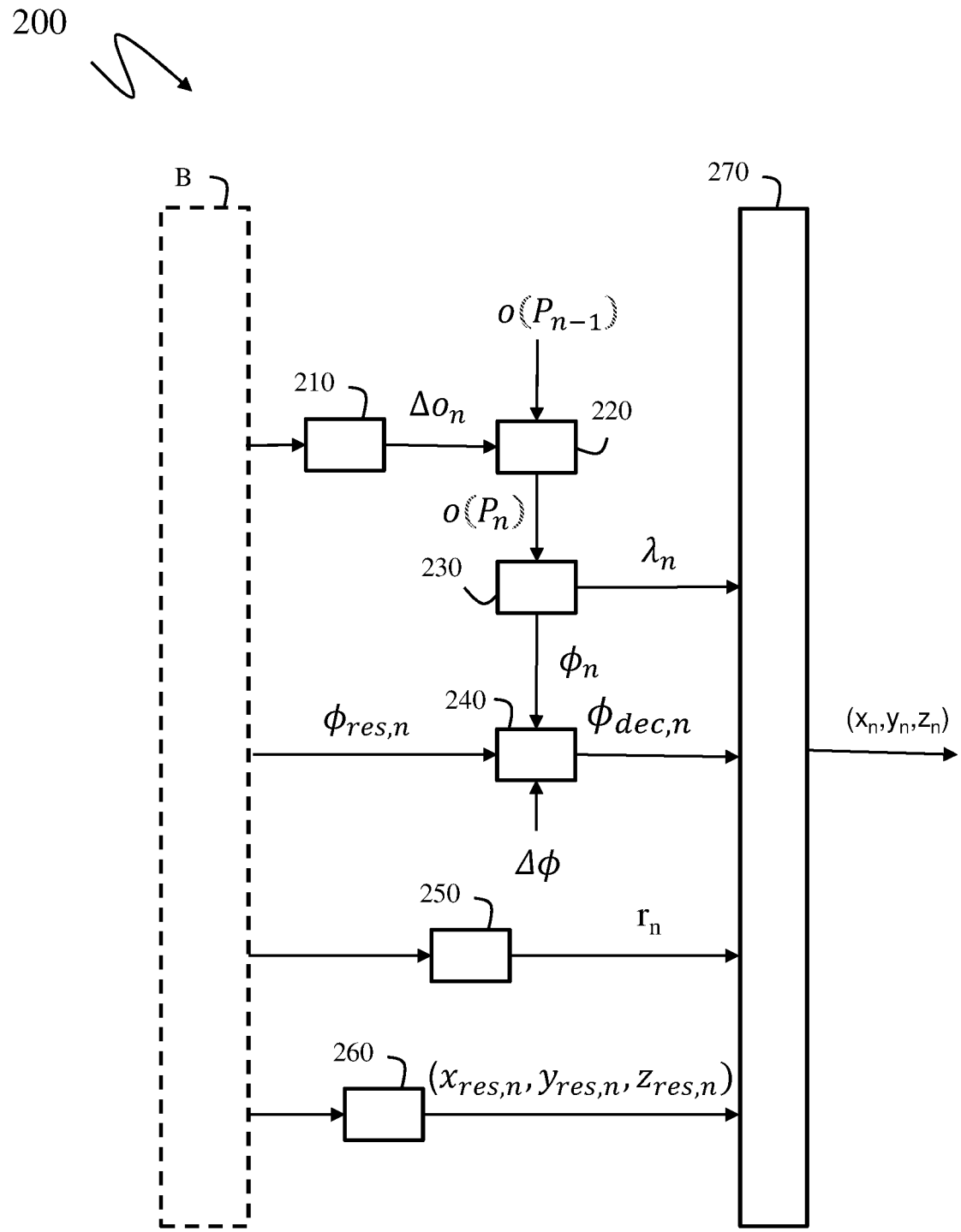
FIG. 11 illustrates a block diagram of steps of a method 200 of decoding a point cloud from a bitstream of encoded point cloud data representing a physical object in accordance with at least one exemplary embodiment.

FIG. 11 illustrates a block diagram of steps of a method 200 of decoding a point cloud from a bitstream of encoded point cloud data representing a physical object in accordance with at least one exemplary embodiment.

Decoding points of a point cloud from a bitstream B requires information such a number N of points of the point cloud, order index $o(P_1)$ of a first point in the 2D coordinates ($\phi$, $\lambda$) system, and sensor setup parameters such as the elementary azimuthal shift $\Delta\phi$ or an elevation angle $\theta_k$ associated with each sensor k. This information may also be decoded from the bitstream B or received by any other means or may be known beforehand by a decoder.

N points of the point cloud are decoded recursively.

In step 210, at least one order index difference $\Delta o_n$ (n=2 to N) is decoded from the bitstream B. Each order index difference $\Delta o_n$ is decoded for a current point $P_n$.

In step 220, an order index $o(P_n)$ is obtained for a current point $P_n$ by:

$$o(P_n) = o(P_{n-1}) + \Delta o_n$$

The order index difference $\Delta o_n$ represents a difference between an order index associated with the current point $P_n$ and another order index $o(P_{n-1})$ associated with a previously decoded point $P_{n-1}$.

In step 230, a sensor index $\lambda_n$ associated with a sensor that captured the current point $P_n$ and an azimuthal angle $\phi_n$ representing a capture angle of said sensor are obtained from the order index $o(P_n)$.

According to an exemplary embodiment of step 230, the sensor index $\lambda_n$ and the azimuthal angles $\phi_n$ are obtained by equations (1) and (2).

Optionally, in step 240, a decoded azimuthal angle $\phi_{dec,n}$ is obtained based on the azimuthal angle $\phi_n$.

According to an embodiment of step 240, the decoded azimuthal angles $\phi_{dec,n}$ is obtained based on the azimuthal angle $\phi_n$ and the elementary azimuthal shift $\Delta\phi$.

According to an embodiment of step 240, the decoded azimuthal angle $\phi_{dec,n}$ is given by:

$$\phi_{dec,n} = \phi_n * \Delta\phi$$

According to an embodiment of step 240, the decoded azimuthal angle $\phi_{dec,n}$ is obtained based on a residual azimuthal angle $\phi_{res,n}$ decoded from the bitstream B.

According to an embodiment of step 240, the decoded azimuthal angle $\phi_{dec,n}$ is given by:

$$\phi_{dec,n} = \phi_n * \Delta\phi + \phi_{res,n}$$

Optionally, in step 250, a radius value $r_n$ of spherical coordinates of the current points $P_n$ is decoded from the bitstream B.

According to an exemplary embodiment of step 250, the radius values $r_n$ are de-quantized to obtain decoded radius values $r_{dec,n}$.

According to an exemplary embodiment of step 250, the radius values $r_n$ are entropy-decoded and de-quantized to obtain decoded radius values $r_{dec,n}$.

Optionally, in step 260, a residual $(x_{res,n}, y_{res,n}, z_{res,n})$ of three-dimensional cartesian coordinates of the current point $P_n$ is decoded from a bitstream B.

According to an exemplary embodiment of step 260, the residual $(x_{res,n}, y_{res,n}, z_{res,n})$ is entropy-decoded.

Optionally, in step 270, the three-dimensional cartesian coordinates (x,y,z) of the current point $P_n$ are decoded based on the decoded residual $(x_{res,n}, y_{res,n}, z_{res,n})$ of the three-dimensional cartesian coordinates of the current point $P_n$, the radius value $r_n$, the decoded azimuthal angle $\phi_{dec,n}$ and the sensor index $\lambda_n$.

According to an exemplary embodiment of step 270, the three-dimensional cartesian coordinates (x,y,z) of the current point $P_n$ are the sums of the residuals $(x_{res,n}, y_{res,n}, z_{res,n})$ and estimated three-dimensional coordinates $(x_{estim}, y_{estim}, z_{estim})$ $$\begin{cases} x = x_{res,n} + x_{estim} \\ y = y_{res,n} + y_{estim} \\ z = z_{res,n} + z_{estim} \end{cases}$$

According to an exemplary embodiment of step 270, the estimated coordinates $(x_{estim}, y_{estim})$ associated with the current point $P_n$ are based on the azimuthal angle $\phi_n$ and the radius value $r_n$.

According to an exemplary embodiment of step 270, the estimated coordinates $(x_{estim}, y_{estim})$ are given by:

$$\begin{cases} x_{estim} = r_n * \cos(\phi_{\phi_n}) \\ y_{estim} = r_n * \sin(\phi_{\phi_n}) \end{cases}$$

According to another exemplary embodiment of step 270, the estimated coordinates $(x_{estim,n}, y_{estim,n})$ are given by:

$$\begin{cases} x_{estim,n} = r_{dec,n} * \cos(\phi_{dec,n}) \\ y_{estim,n} = r_{dec,n} * \sin(\phi_{dec,n}) \end{cases}$$

where $r_{dec,n}$ are decoded radius values obtained from radius values $r_n$. For example, the decoded radius values $r_{dec,n}$ may be obtained by de-quantizing the radius values $r_n$.

According to an exemplary embodiment of step 270, the estimated coordinate $(z_{estim})$ associated with the current point $P_n$ is based on the radius value $r_n$ associated with current point $P_n$ and an elevation angle $\phi_k$ of a sensor k that captured the current point $P_n$.

According to an exemplary embodiment of step 270, the estimated coordinates $(z_{estim})$ are given by:

$$z_{estim} = r_n \tan \theta_k$$

According to an exemplary embodiment of step 270, the estimated coordinates $(z_{estim})$ are also based on the sensor index A n.

According to an exemplary embodiment of step 270, the estimated coordinates $(z_{estim})$ are given by:

$$z_{estim} = r_n \tan \theta_{\lambda,n}$$

Figure 12:
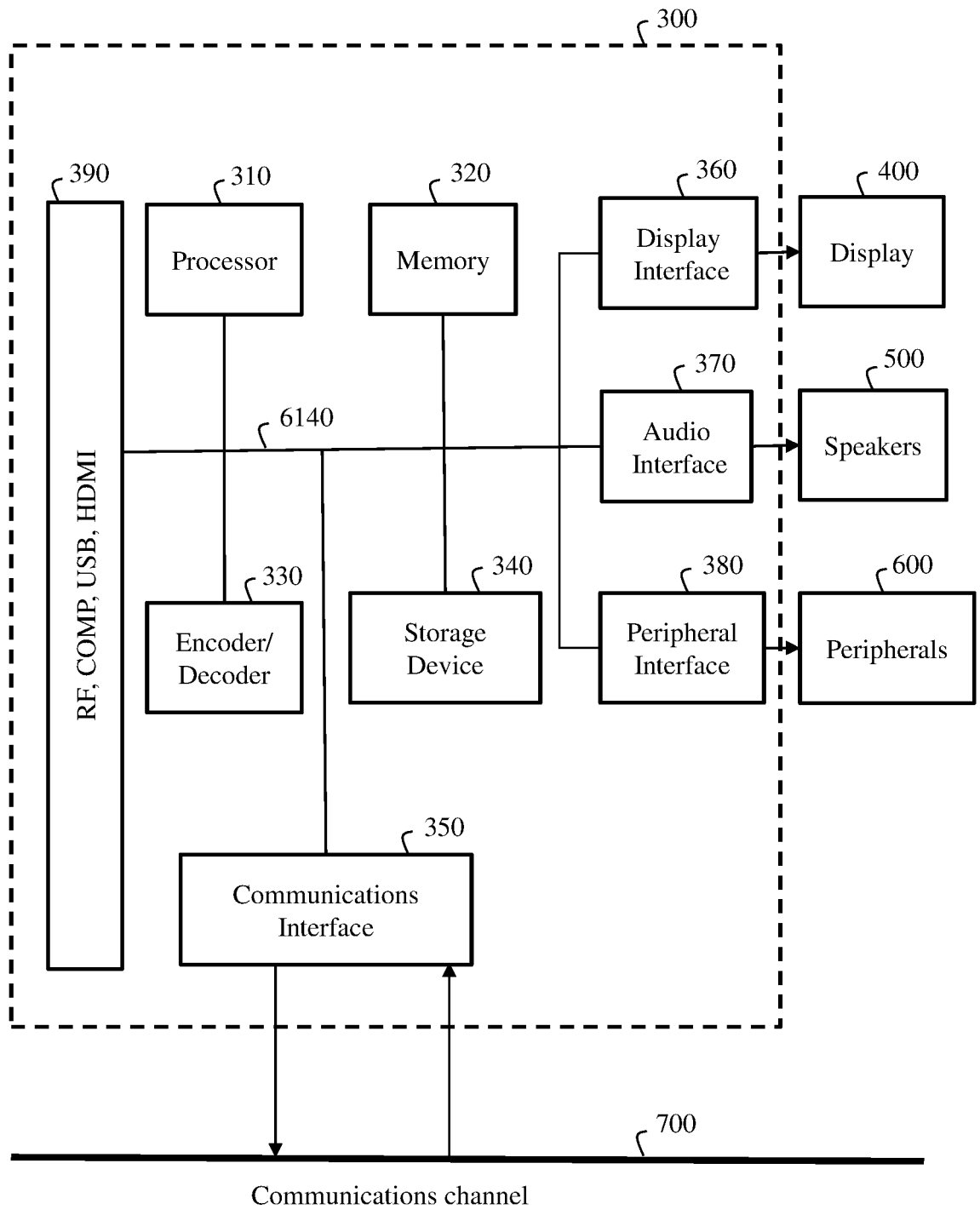
FIG. 12 illustrates a schematic block diagram of an example of a system in which various aspects and exemplary embodiments are implemented.

FIG. 12 shows a schematic block diagram illustrating an example of a system in which various aspects and exemplary embodiments are implemented.

System 300 may be embedded as one or more devices including the various components described below. In various embodiments, the system 300 may be configured to implement one or more of the aspects described in the present application.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present application. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both of the encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the present application may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may include the bitstream B and/or information such a number of points of a point cloud, coordinates or order $o(P_1)$ of a first point in the 2D coordinates $(\phi, \lambda)$ system and/or sensor setup parameters such as such as an elementary azimuthal shift $\Delta\phi$ or an elevation angle $\theta_k$ associated with a sensor of the Lidar head 10.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input 390 is part of a separate set-top box. In various embodiments in which the display 400 and speakers 500 may be external components, the output signal may be provided via dedicated output connections, including, for example, HDMI ports, USB ports, or COMP outputs.

In FIGS. 1-12, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "N/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or order o($P_1$) of a first point in the 2D coordinates ($\phi$, $\lambda$) system or sensor setup parameters such as the elementary azimuthal shift $\Delta\phi$ or an elevation angle $\theta_k$ associated with a sensor k. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data representing a physical object, wherein the method comprises:
    obtaining, for each point of the point cloud, a sensor index associated with a sensor that captured the point, an azimuthal angle representing a capture angle of said sensor;
    ordering points of the point cloud based on the azimuthal angles and the sensor indices; and
    encoding, into the bitstream, at least one order index difference representing a difference between order indices of two consecutive ordered points.

2. The method of claim 1, wherein the method further comprises encoding, into the bitstream, radius values.

3. The method of claim 2, wherein the method further comprises encoding, in the bitstream, residuals of three-dimensional cartesian coordinates of ordered points based on their three-dimensional cartesian coordinates, on decoded azimuthal angles obtained from azimuthal angles, on decoded radius values obtained from radius values, and on sensor indices.

4. The method of claim 3, wherein the decoded azimuthal angles are obtained from residual azimuthal angles associated with ordered points, and wherein the method further comprises encoding, in the bitstream, the residual azimuthal angles.

5. A method of decoding a point cloud from a bitstream of encoded point cloud data representing a physical object, wherein the method comprises:
    decoding, from the bitstream, at least one order index difference representing a difference between order indices of two consecutive ordered points of the point cloud; and
    obtaining, for each point of the point cloud, a sensor index associated with a sensor that captured the point and an azimuthal angle representing a capture angle of said sensor from an order index obtained from a decoded order index difference.

6. The method of claim 5, wherein the method further comprises decoding radius values from the bitstream and obtaining decoded radius values from the radius values.

7. The method of claim 6, wherein the method further comprises decoding, from the bitstream, residuals of three-dimensional cartesian coordinates of ordered points and obtaining decoded three-dimensional cartesian coordinates of ordered points based on their decoded azimuthal angles obtained from the azimuthal angles, on their decoded radius values and on their sensor indices.

8. The method of claim 7, wherein the method further comprises decoding residual azimuthal angles from the bitstream, and wherein the decoded azimuthal angles are obtained from the residual azimuthal angles.

9. An electronic device, comprising:
    a processor; and
    a memory for storing instructions executable by the processor;
    wherein the processor is configured to encode a point cloud into a bitstream of encoded point cloud data representing a physical object, wherein the processor is configured to:
    obtain, for each point of the point cloud, a sensor index associated with a sensor that captured the point, an azimuthal angle representing a capture angle of said sensor;

order points of the point cloud based on the azimuthal angles and the sensor indices; and encode, into the bitstream, at least one order index difference representing a difference between order indices of two consecutive ordered points.

10. The electronic device of claim 9, wherein the processor is further configured to encode, into the bitstream, radius values.

11. The electronic device of claim 10, wherein the processor is further configured to encode, in the bitstream, residuals of three-dimensional cartesian coordinates of ordered points based on their three-dimensional cartesian coordinates, on decoded azimuthal angles obtained from azimuthal angles, on decoded radius values obtained from radius values, and on sensor indices.

12. The electronic device of claim 11, wherein the decoded azimuthal angles are obtained from residual azimuthal angles associated with ordered points, and wherein the processor is further configured to encode, in the bitstream, the residual azimuthal angles.

* * * * *